United States Patent
Shen et al.

(10) Patent No.: US 11,928,287 B2
(45) Date of Patent: Mar. 12, 2024

(54) TOUCH CONTROL CHIP, CODING METHOD AND ELECTRONIC DEVICE

(71) Applicant: SHENZHEN GOODIX TECHNOLOGY CO., LTD., Guangdong (CN)

(72) Inventors: Haiming Shen, Guangdong (CN); Liangguang Peng, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/477,662

(22) Filed: Sep. 17, 2021

(65) Prior Publication Data

US 2022/0091720 A1 Mar. 24, 2022

Related U.S. Application Data

(63) Continuation of application No. PCT/CN2020/116092, filed on Sep. 18, 2020.

(51) Int. Cl.
*G06F 3/041* (2006.01)
*G06F 3/044* (2006.01)
*G09G 3/20* (2006.01)

(52) U.S. Cl.
CPC ........ *G06F 3/04184* (2019.05); *G06F 3/0441* (2019.05); *G09G 3/20* (2013.01); *G09G 2320/02* (2013.01)

(58) Field of Classification Search
None
See application file for complete search history.

(56) References Cited

U.S. PATENT DOCUMENTS

| | | | |
|---|---|---|---|
| 10,503,326 B2 | 12/2019 | Dinu et al. | |
| 2013/0342478 A1* | 12/2013 | Bae | G06F 3/0443 345/173 |
| 2014/0062940 A1* | 3/2014 | Al-Dahle | G06F 3/0412 345/87 |

(Continued)

FOREIGN PATENT DOCUMENTS

| | | |
|---|---|---|
| CN | 1298115 A | 6/2001 |
| CN | 101103389 A | 1/2008 |

(Continued)

*Primary Examiner* — Benjamin C Lee
*Assistant Examiner* — Emily J Frank
(74) *Attorney, Agent, or Firm* — Scully, Scott, Murphy & Presser, P.C.

(57) ABSTRACT

A touch control chip, a coding method, and an electronic device are provided, which can effectively reduce influence of a coding signal of a touch control layer of a screen on a display layer. The touch control chip includes: a driving circuit configured to output the coding signal to a display layer of the screen; and a control circuit configured to adjust a driving impedance of the driving circuit during a period when the driving circuit outputs the coding signal, so that a value of the driving impedance in a display sensitive interval of the display layer is greater than a value of the driving impedance in a time interval outside the display sensitive interval, where the display sensitive interval includes a pixel update interval of the display layer, and the pixel update interval is the time interval for a pixel in the display layer to receive a data signal.

18 Claims, 6 Drawing Sheets

(56) References Cited

U.S. PATENT DOCUMENTS

| | | | | |
|---|---|---|---|---|
| 2014/0253536 A1* | 9/2014 | Honda | ................ | G06F 3/0412 |
| | | | | 345/87 |
| 2016/0299614 A1* | 10/2016 | Yang | ................... | G09G 3/3655 |
| 2016/0357292 A1 | 12/2016 | Suzuki et al. | | |
| 2018/0059818 A1 | 3/2018 | Dinu et al. | | |
| 2018/0081491 A1* | 3/2018 | Holland | ............. | G06F 3/04184 |
| 2018/0239479 A1 | 8/2018 | Suzuki et al. | | |
| 2019/0325810 A1* | 10/2019 | Ku | ....................... | G06F 3/0416 |
| 2020/0387283 A1 | 12/2020 | Jiang et al. | | |
| 2021/0200368 A1* | 7/2021 | Wang | ................... | G06F 3/0412 |
| 2022/0276712 A1* | 9/2022 | Orita | ....................... | G06F 3/044 |

FOREIGN PATENT DOCUMENTS

| CN | 102375592 A | 3/2012 |
|---|---|---|
| CN | 103218976 A | 7/2013 |
| CN | 104076544 A | 10/2014 |
| CN | 104835473 A | 8/2015 |
| CN | 109272919 A | 1/2019 |
| CN | 110462571 A | 11/2019 |
| CN | 209803753 U | 12/2019 |

\* cited by examiner

1300

```
┌─────────────────────────────────────┐
│ acquire a display sensitive interval of a display │
│ layer, where the display sensitive interval includes │ ⟋ 1310
│ a pixel update interval of the display layer, and the │
│ pixel update interval is a time interval for a pixel in │
│ the display layer to receive a data signal │
└─────────────────────────────────────┘
                    │
┌─────────────────────────────────────┐
│ output a driving signal to a touch control layer of a │
│ screen, and adjust a driving impedance of the │
│ driving circuit during a period of outputting the │ ⟋ 1320
│ driving signal, so that a value of the driving │
│ impedance in a display sensitive interval is greater │
│ than a value of the driving impedance in a time │
│ interval outside the display sensitive interval │
└─────────────────────────────────────┘
```

FIG.13 ized interval, which reduces influence of the driving signal of the touch control layer on reception of the data signal of the pixel in the display sensitive interval.

TOUCH CONTROL CHIP, CODING METHOD AND ELECTRONIC DEVICE

CROSS-REFERENCE TO RELATED APPLICATIONS

This application is a continuation of International Application No. PCT/CN2020/116092, filed on Sep. 18, 2020, the disclosure of which is hereby incorporated by reference in its entirety.

TECHNICAL FIELD

Embodiments of the present application relate to the field of touch control, and more particularly, to a touch control chip, a driving method and an electronic device.

BACKGROUND

As a screen becomes thinner and thinner, distance between a touch control layer and a display layer in the screen is getting closer and closer, causing a driving signal in the touch control layer to affect the display layer, so that a display appear an interference pattern similar to water ripples, which greatly affects user experience.

SUMMARY

Embodiments of the present application provide a touch control chip, a driving method, and an electronic device, which can effectively reduce influence of a driving signal in a touch control layer of a screen on a display layer.

According to a first aspect, a touch control chip is provided, including:
- a driving circuit configured to output a driving signal to a touch control layer of a screen; and
- a control circuit configured to adjust a driving impedance of the driving circuit during a period when the driving circuit outputs the driving signal, so that a value of the driving impedance in a display sensitive interval of a display layer of the screen is greater than a value of the driving impedance in a time interval outside the display sensitive interval, where the display sensitive interval comprises a pixel update interval of the display layer, and the pixel update interval is the time interval for a pixel in the display layer to receive a data signal.

On the basis of the technical solution, by adjusting the driving impedance of the driving circuit in the touch control chip, the value of the driving impedance in the display sensitive interval of the display layer is greater than the value of the driving impedance in the time interval outside the display sensitive interval, so as to reduce influence of the driving signal output by the touch control chip on the display layer in the display sensitive interval, ensuring a normal update of pixel data of the display layer.

In a possible implementation manner, the driving circuit includes a first resistance and a second resistance, the first resistance is greater than the second resistance, and the control circuit is specifically configured to: during the period when the driving circuit outputs the driving signal, control the first resistance to be turned on in the display sensitive interval, and control the second resistance to be turned on in the time interval outside the display sensitive interval, so that a value of the driving impedance in the display sensitive interval is greater than a value of the driving impedance in the time interval outside the display sensitive interval.

Since the driving impedance of the driving circuit includes the impedance generated by wiring, switching, etc. in the driving circuit, and includes the impedance of a resistance element, by setting two resistances with different resistance values in the driving circuit, and selecting different resistances in the display sensitive interval and the time interval outside the display sensitive interval, respectively, so that the value of the driving impedance in the display sensitive interval of the display layer is greater than the value of the driving impedance in the time interval outside the display sensitive interval, which reduces influence of the driving signal of the touch control layer on reception of the data signal of the pixel in the display sensitive interval.

In a possible implementation manner, the driving circuit includes an adjustable resistance, and the control circuit is specifically configured to: during the period when the driving circuit outputs the driving signal, adjust a resistance value of the adjustable resistance, so that a value of the driving impedance in the display sensitive interval is greater than a value of the driving impedance in the time interval outside the display sensitive interval.

Since the driving impedance of the driving circuit includes the impedance generated by the wiring, the switching, etc. in the driving circuit, and includes the impedance of the resistance element, by replacing the resistance element in the driving circuit with a variable resistance, and adjusting a resistance value of the variable resistance in the display sensitive interval and the time interval outside the display sensitive interval, respectively, so that the value of the driving impedance in the display sensitive interval of the display layer is greater than the value of the driving impedance in the time interval outside the display sensitive interval, which reduces influence on update of the data signal of the pixel in the display sensitive interval.

In a possible implementation manner, a slope of a flipping edge of the driving signal in the display sensitive interval is smaller than a slope of the flipping edge of the driving signal in the time interval outside the display sensitive interval.

Since a resistance value of the driving circuit in the display sensitive interval is greater, slopes of a rising edge and a falling edge of the driving signal output by the driving circuit in the display sensitive interval become smaller and slower, so as to reduce the influence on the update of the pixel data in the sensitive interval.

In a possible implementation manner, the driving impedance is a constant value in the display sensitive interval.

In a possible implementation manner, the driving impedance is variable in the display sensitive interval.

In a possible implementation manner, the display sensitive interval includes a plurality of periods, and a value of the driving impedance in the plurality of periods is at least partially unequal.

In a possible implementation manner, a value of the driving impedance in the plurality of periods is determined according to an influence degree of the display layer affected by the driving signal in the plurality of periods.

In a possible implementation manner, a value of the driving impedance in a period with a high influence degree is greater than a value of the driving impedance in a period with a small influence degree.

The driving impedance of the driving circuit can be the constant value in the display sensitive interval, but considering that influence of the driving signal on the display layer in the display sensitive interval may be different, the driving impedance can also be changed in the display sensitive interval. When the driving impedance can be changed in the display sensitive interval, the variable resistance can be adjusted to have different resistance values in different periods in the display sensitive interval, and all these resistance values are greater than the resistance values in the time interval outside the display sensitive interval.

In a possible implementation manner, the driving signal is at least one of the following: a driving signal configured for a self-capacitance detection of the touch control layer; a driving signal configured for a mutual-capacitance detection of the touch control layer; and a driving signal transmitted by the touch control layer to an active pen.

According to a second aspect, a driving method is provided, including:
acquiring a display sensitive interval of a display layer of a screen, wherein the display sensitive interval comprises a pixel update interval of the display layer, and the pixel update interval is a time interval for a pixel in the display layer to receive a data signal;
outputting a driving signal to a display layer of the screen, and during a period of outputting the driving signal, adjusting a driving impedance of a driving circuit in a touch control chip, so that a value of the driving impedance in the display sensitive interval is greater than a value of the driving impedance in a time interval outside the display sensitive interval.

In a possible implementation manner, the driving circuit includes a first resistance and a second resistance, the first resistance is greater than the second resistance, and adjusting the driving impedance of the driving circuit in the touch control chip, including: controlling the first resistance to be turned on in the display sensitive interval, and controlling the second resistance to be turned on in the time interval outside the display sensitive interval, so that a value of the driving impedance in the display sensitive interval is greater than a value of the driving impedance in the time interval outside the display sensitive interval.

In a possible implementation manner, the driving circuit includes an adjustable resistance, and adjusting the driving impedance of the driving circuit in the touch control chip, including: adjusting a resistance value of the adjustable resistance, so that a value of the driving impedance in the display sensitive interval is greater than a value of the driving impedance in the time interval outside the display sensitive interval.

In a possible implementation manner, a slope of a flipping edge of the driving signal in the display sensitive interval is smaller than a slope of a flipping edge of the driving signal in the time interval outside the display sensitive interval.

In a possible implementation manner, the driving impedance is a constant value in the display sensitive interval.

In a possible implementation manner, the driving impedance is variable in the display sensitive interval.

In a possible implementation manner, the display sensitive interval includes a plurality of periods, and a value of the driving impedance in the plurality of periods is at least partially unequal.

In a possible implementation manner, a value of the driving impedance in the plurality of periods is determined according to an influence degree of the display layer affected by the driving signal in the plurality of periods.

In a possible implementation manner, a value of the driving impedance in a period with a high influence degree is greater than a value of the driving impedance in a period with a small influence degree.

In a possible implementation manner, the driving signal is at least one of the following: a driving signal configured for a self-capacitance detection of the touch control layer; a driving signal configured for a mutual-capacitance detection of the touch control layer; and a driving signal transmitted by the touch control layer to an active pen.

In a third aspect, an electronic device is provided, including: a screen; and the touch control chip in the foregoing first aspect and any one of the possible implementation manners of the first aspect.

BRIEF DESCRIPTION OF DRAWINGS

FIG. 13 is a schematic flowchart of a driving method according to an embodiment of the present application.

DESCRIPTION OF EMBODIMENTS

Figure 1:
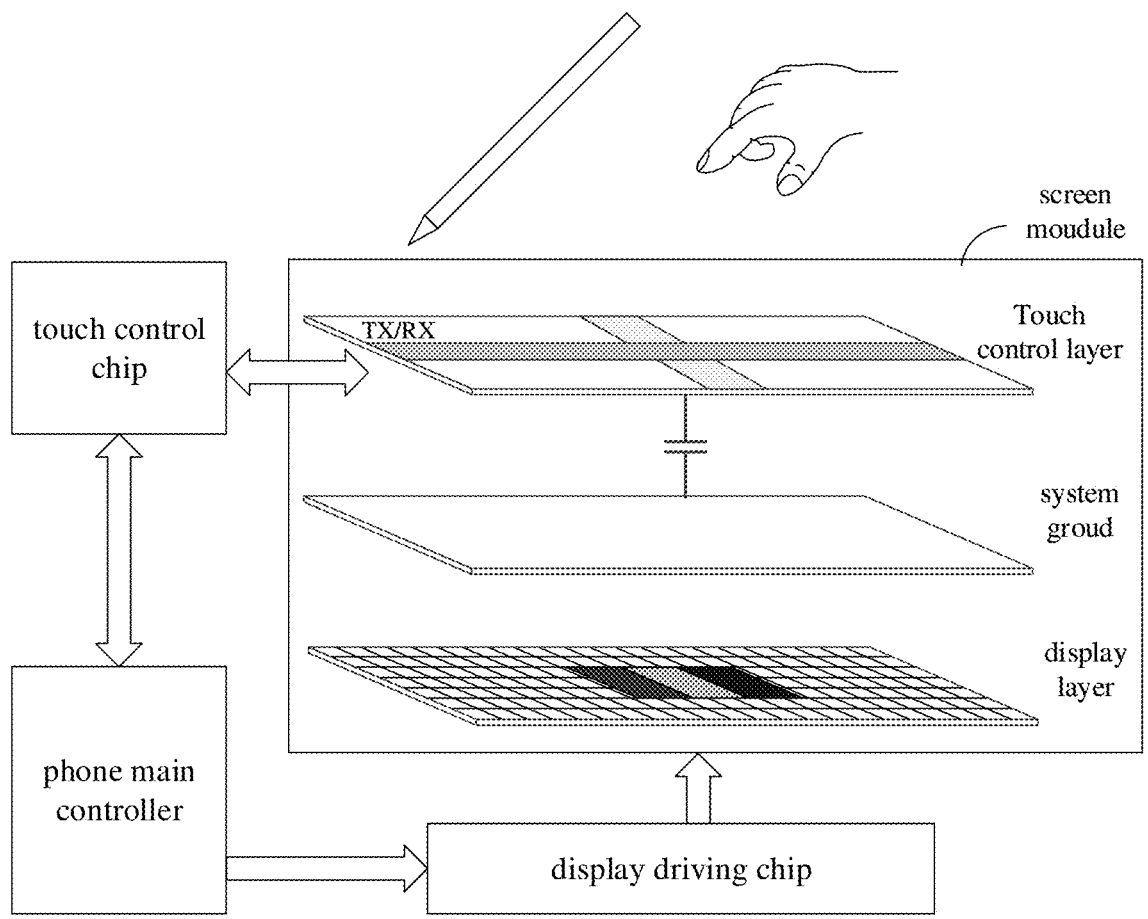
FIG. 1 is a schematic diagram of a screen module.

The following describes technical solutions of the present application with reference to accompanying drawings.

With the development of smart phones and tablets, it is necessary to make a screen thinner to reduce a thickness of a phone, or to allow more space inside the phone to accommodate other devices with the same thickness. A conversion of screen types from liquid crystal display (LCD) to organic light emitting diode (OLED) is a typical trend. However, when the OLED screen becomes thinner, a basic capacitance of a touch control electrode of a touch control electrode layer (hereinafter referred to as a touch control layer) in the screen can be larger, so that the change of a capacitance of the touch control electrode relative to the basic capacitance may reduce when a finger touches the screen, which reduces a sensitivity of a touch control detection. The touch control electrodes in the touch control layer includes driving electrodes in a TX direction and sensing electrodes in a RX direction.

The first step to ensure the sensitivity of the touch control detection is to improve a driving capability of a touch control detection system. Theoretically, if the driving capability of the touch control detection system is too strong, a driving signal output by the touch control chip can be coupled from the electrode in a touch control layer to a display layer through a common cathode between the touch control layer and the display layer, and when a display driving chip of the display layer refreshes pixel data of the display layer, the pixel data or a voltage of a light-emitting diode may be interfered, finally stripes with different thickness and spacing are formed on the display, and then are superimposed on an original display frame. Since a clock of the touch control chip is not synchronized with that of the display driving chip, the stripes may move along a direction in which the display driving chip updates the pixel data, that is, a direction of a horizontal synchronization signal (Hsync signal), and such a phenomenon is called water ripples.

In a practical application, when a working process of the touch control chip involves a driving operation, the water ripples of different degrees may be generated, such as the driving operation in a self-capacitance detection, the driving operation in a mutual-capacitance detection, and an operation of sending an uplink driving signal (also referred to as an uplink code) to an active pen, etc. The self-capacitance detection and the mutual-capacitance detection can adopt a synchronization strategy to avoid flipping a voltage of the driving signal at the time when the display driving chip updates the data in a scanning cycle of each horizontal synchronization signal, so as to avoid the water ripples. However, the uplink driving signal of the active pen cannot be circumvented in the same way due to a limitation of a communication protocol of the active pen.

In this regard, the present application provides a solution of touch control driving, which can effectively reduce influence of the driving signal in the touch control layer of the screen on the display layer. It should be appreciated understood that a method described in the embodiments of the present application is applicable to the driving operation of the touch control chip, the driving operation includes but not limited to the driving operation in the self-capacitance detection, the driving operation in the mutual-capacitance detection, and the operation of sending the uplink driving signal to the active pen, etc.

Combined with FIGS. 1-6, the following will describe the reasons why the driving signal in the touch control layer of the screen affects the display layer in detail.

FIG. 1 is a schematic diagram of a screen module. The touch control layer and the display layer in the screen module are usually two independent and separate systems, and theoretically, they may not interfere with each other or have less interference. However, as today's screen is becoming thinner and thinner, the touch control electrode in the touch control layer is closer to system ground, which increases the self-capacitance of the touch control electrode to the system ground from about 100 pF before to about 500 pF now, as a result, mutual influence between the touch control layer and the display layer cannot be ignored. On the one hand, the display layer may have a certain influence on the touch control layer, for example, a signal of the display layer is coupled to the touch control electrode in the touch control layer, which may interfere with an original effective signal of the touch control layer in the touch control detection, resulting in a more difficult touch control detection; on the other hand, the touch control layer may also has an influence on the display layer, for example, the driving signal in the touch control layer is coupled to the driving circuit of the display driving chip, which may interferes with the update of the pixel data, causing that the foregoing water ripples appear in the display frame. The present application mainly proposes a solution for the influence of the touch control layer on the display layer.

Taking an application of the active pen as an example, as shown in FIG. 1, the touch control chip transmits the uplink driving signal to the touch control electrode in the touch control layer, and establishes a connection with the active pen. When the active pen identify the uplink driving signal, it returns a downlink driving signal, which includes a coordinate position of a tip of the active pen, a pressing force of the active pen and key information, etc. In order to ensure that the active pen has a certain hover height and handwriting is continuous in the process of using, a driving voltage of the active pen is usually high, and the self-capacitance of the touch control electrode to ground is large, which makes the uplink driving signal output by the touch control chip affect the update of the pixel data of the display layer.

Figure 2:
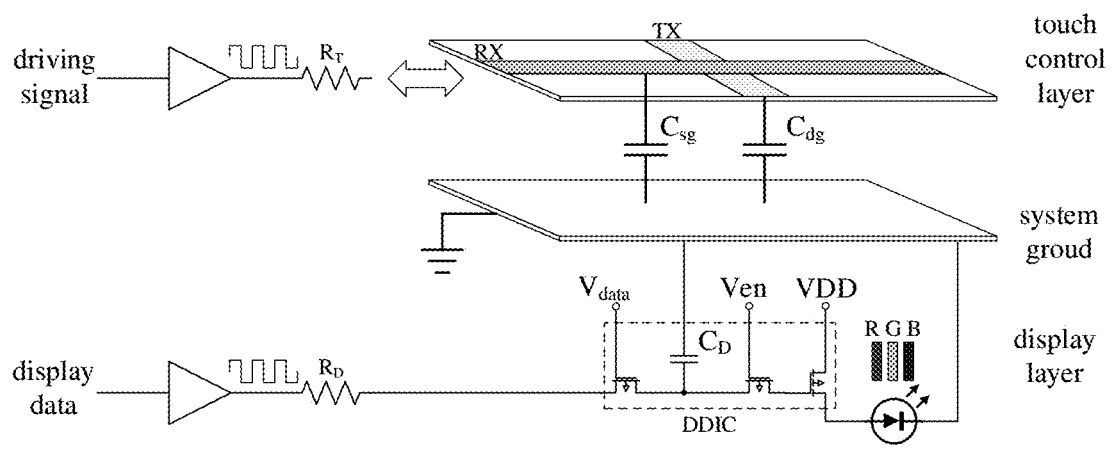
FIG. 2 is a schematic diagram of a circuit structure of a display layer of the screen module.
Figure 3:
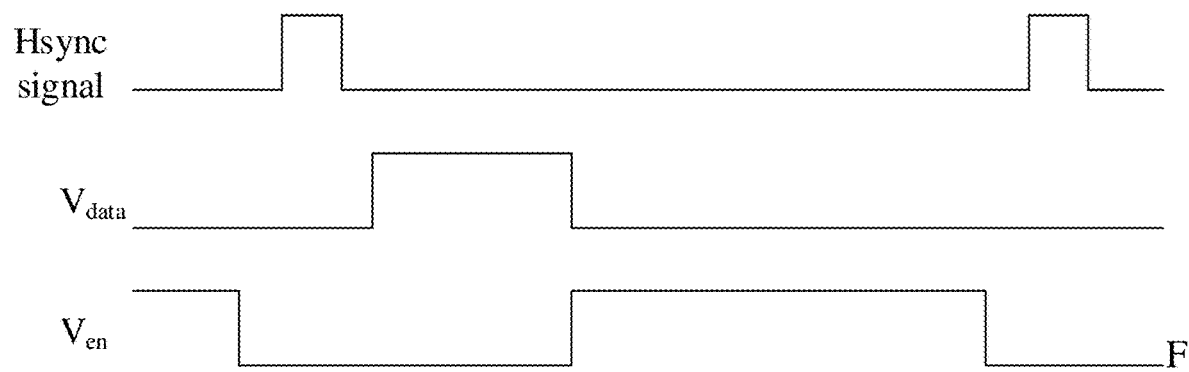
FIG. 3 is a timing diagram of a voltage signal in the display layer shown in FIG. 2.

The display driving chip updates the pixel data of a line of pixels in the display layer in the scanning cycle of each horizontal synchronization signal. As shown in FIG. 2 and FIG. 3, the update of the pixel data mainly includes two processes: firstly, a $V_{data}$ voltage in the display layer is pulled up, and a Ven voltage is kept as a low level, so that the pixel data is cached to a buffer capacitance $C_D$, and the pixel data shown on the display at this time is still the pixel data of a previous frame; secondly, the $V_{data}$ voltage is pulled down, and the Ven voltage is pulled up, so that the pixel data of a current frame is updated to the display. It should be appreciated that FIG. 2 and FIG. 3 are merely for a purpose of explaining the principle, and factors such as delay and reset are not considered in the update process of the pixel data shown in FIG. 2 and FIG. 3.

During the foregoing process when the $V_{data}$ is pulled up to update the pixel data, if the driving signal output by the touch control chip is coupled to the system ground connected between the touch control layer and the display layer, and then coupled to the buffer capacitance $C_D$, then it will affect the pixel data of a current line of the pixels. A general result is that the voltage on the buffer capacitance $C_D$ is suddenly too high or too low, causing the pixels of the line to be too bright or too dark, in this way, bright and dark stripes are formed for a whole picture.

Here, in the scanning cycle of the horizontal synchronization signal, a time interval for the pixels in the display layer to receive a data signal to update the pixel data is called a pixel update interval, for example, a time interval in which the $V_{data}$ is pulled up as shown in FIG. 3.

The touch control chip pulls up or pulls down the level of the output driving signal in the pixel update interval, that is, when the driving signal is flipping in the pixel update interval, the display can show the bright and dark stripes. In a practical application, one or more pixel update intervals may occur in the scanning cycle of the horizontal synchronization signal.

Figure 4:
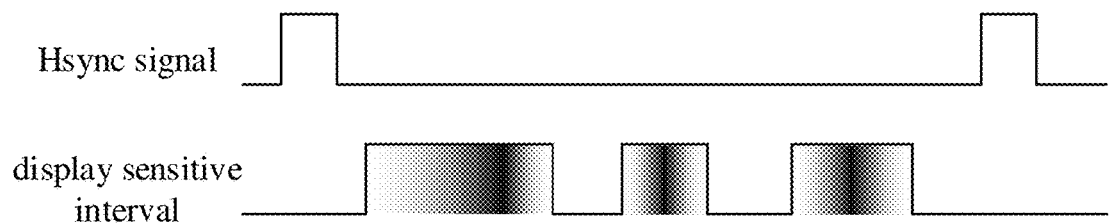
FIG. 4 is a schematic diagram of a display sensitive interval.

Besides, it should be understood that in addition to the bright and dark stripes shown on the display due to the flipping of the driving signal in the touch control layer in the pixel update interval, other factors may also cause similar problems. For example, the switching of a switch associated with a pixel data update process in an internal circuit of the display layer may also cause such bright and dark stripes to appear before and after a switching moment. When control voltages of these switches are pulled up or pulled down, such bright and dark stripes may appear within a certain period nearby. Therefore, there may be a plurality of time intervals in the scanning cycle of the horizontal synchronization signal, so that the driving signal in the touch control layer can easily affect the display layer, thereby resulting in the bright and dark stripes. Here, these time intervals and the foregoing pixel update interval are collectively referred to as the display sensitive interval, or a water ripples sensitive interval. For example, as shown in FIG. 4, there are a plurality of the display sensitive intervals in the scanning cycle of the horizontal synchronization signal, and for the plurality of the display sensitive intervals, the display layer in each display sensitive interval may be affected differently by the driving signal of the touch control layer.

Both self-capacitance driving and mutual-capacitance driving of the touch control layer can reduce the water ripples through a synchronization strategy with the horizontal synchronization signal. For example, the touch control chip avoids flipping the level of the driving signal in the display sensitive interval. But for the uplink driving signal of the active pen, it doesn't work. Taking Microsoft's active pen protocol as an example, it requires that a sub-code length of the uplink driving signal is 1 us and one frame of data must be completed continuously. In addition, a refresh rate of the active pen needs to be as accurate as possible to reduce a bit error rate. Therefore, in principle, a similar synchronization strategy cannot be used between the uplink driving signal of the active pen and the vertical synchronization signal (Vsync signal) and the horizontal synchronization signal (Hsync signal) of the display driving chip to reduce the water ripples.

For the uplink driving signal of the active pen, the following two factors cause the touch control chip to affect the update of the pixel data of the display layer when the touch control chip transmits the uplink driving signal to the touch control layer, so that the bright and dark stripes are shown on the display.

Figure 5:
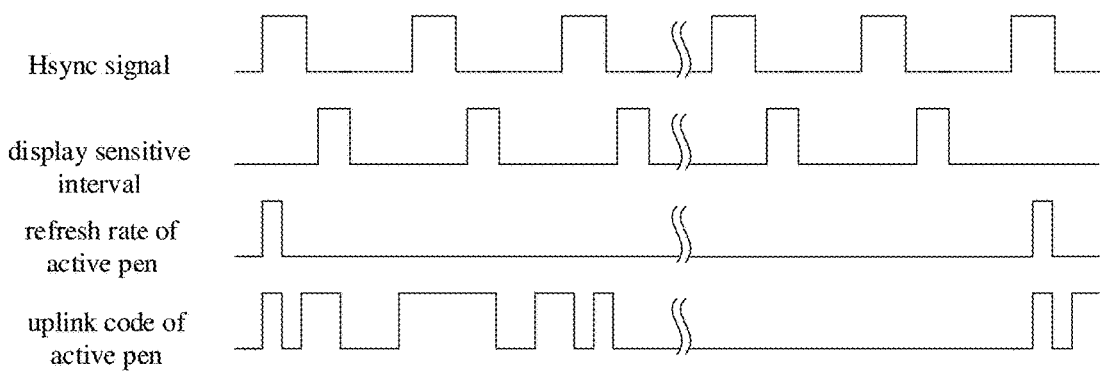
FIG. 5 is a schematic diagram of a relationship between an uplink code of an active pen and a display sensitive interval.

Firstly, as shown in FIG. 5, the refresh rate of the uplink driving signal of the active pen and the clock of the display driving chip have different sources, which is equivalent to existence of a phase drift, causing that the bright and dark stripes move back and forth along a refresh direction of the horizontal synchronization signal in the display frame, so as to form the water ripples. In a refresh cycle of the active pen, there is no water ripples at the moment when the uplink driving signal is not transmitted. Such a sharp contrast intensifies a visual effect of the water ripples.

Figure 6:
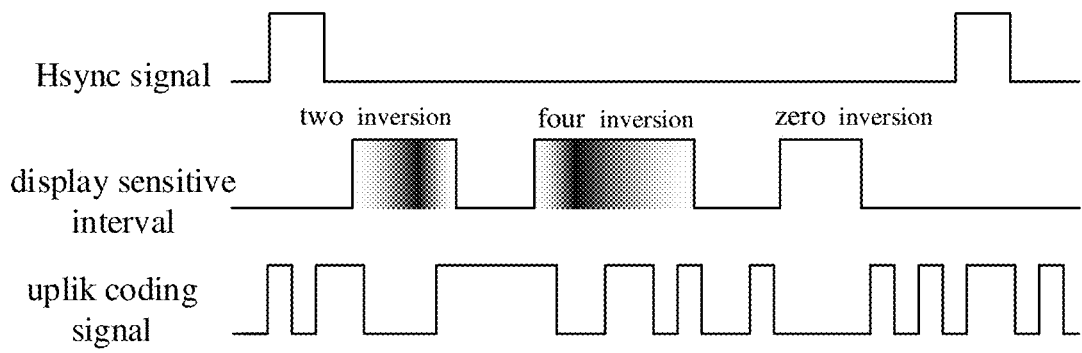
FIG. 6 is a schematic diagram of a relationship between a driving signal and a display sensitivity interval.

Secondly, as shown in FIG. 6, the number of level flipping of the uplink driving signal in the display sensitive interval is changing with a driving process, and the position of the level flipping is also constantly changing, and a combined effect of the two results in the more obvious bright and dark stripes. FIG. 6 show three display sensitive intervals, in the display sensitive intervals, if the level of the uplink driving signal is flipped one or more times, the water ripples can be generated; and if there is no flipping, that is, 0 times of flipping, no water ripples can be generated. When the screen module is determined, transmission of the horizontal synchronization signal is determined, and the display sensitive interval can also be determined.

In order to solve the foregoing problem, the present application provides a solution of the touch control driving, which can effectively reduce the influence of the driving signal in the touch control layer on the display layer of the screen. The following provides a detailed description with reference to FIGS. 7-12.

Figure 7:
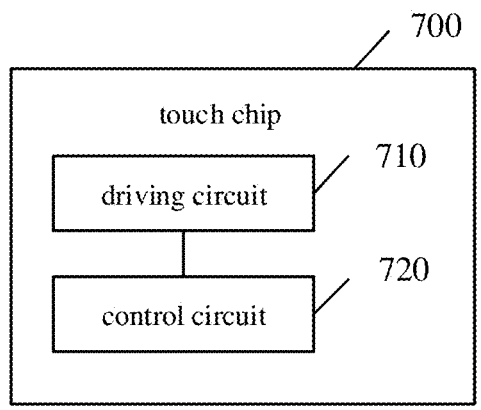
FIG. 7 is a schematic block diagram of a touch control chip according to an embodiment of the present application.

FIG. 7 is a schematic block diagram of a touch control chip according to an embodiment of the present application. As shown in FIG. 7, a touch control chip 700 includes a driving circuit 710 and a control circuit 720.

The driving circuit 710 is configured to output the driving signal to the touch control layer of the screen.

The control circuit 720 is configured to adjust a driving impedance of the driving circuit 710 during a period when the driving circuit outputs the driving signal, so that a value of the driving impedance in a display sensitive interval of a display layer of the screen is greater than a value of the driving impedance in a time interval outside the display sensitive interval.

The display sensitive interval includes a pixel update interval of the display layer, and the pixel update interval is the time interval for a pixel in the display layer to receive a data signal, such as a time interval where the $V_{data}$ at a high level in FIG. 3. However, it should be understood that the display sensitive interval may also include, for example, the time interval that is easily affected by the driving signal caused by other factors in the display layer as described in FIG. 4, for example, the time interval that the display layer is easily affected by the driving signal caused by the switching of the switch associated with the pixel data update process in the internal circuit of the display layer.

For example, the driving signal may be at least one of the following: a driving signal used for a self-capacitance detection of the touch control layer; a driving signal used for a mutual capacitance detection of the touch control layer; and a driving signal transmitted by the touch control layer to an active pen.

In this embodiment, by adjusting the driving impedance in the driving circuit 710 of the touch control chip 700, the value of the driving impedance in the display sensitive interval of the display layer is greater than the value of the driving impedance in the time interval outside the display sensitive interval, so as to avoid influence of the driving signal output by the touch control chip 700 on the display layer in the sensitive interval, ensuring a normal update of the pixel in the display layer.

When this method is adopted, a slope of a flipping edge of the driving signal in the display sensitive interval is smaller than a slope of the flipping edge of the driving signal in the time interval outside the display sensitive interval.

Since the level flipping of the driving signal in the display sensitive interval results in generation of the water ripples, in the display sensitive interval, when the driving impedance in the driving circuit 710 increases, the slope of the flipping edge, that is, a rising edge and a falling edge of the driving signal out by the touch control chip 700 may become small, that is, a waveform of the driving signal becomes slow. In this way, it is possible to reduce or avoid the water ripples generated by the display layer caused by the driving signal.

Figure 8:
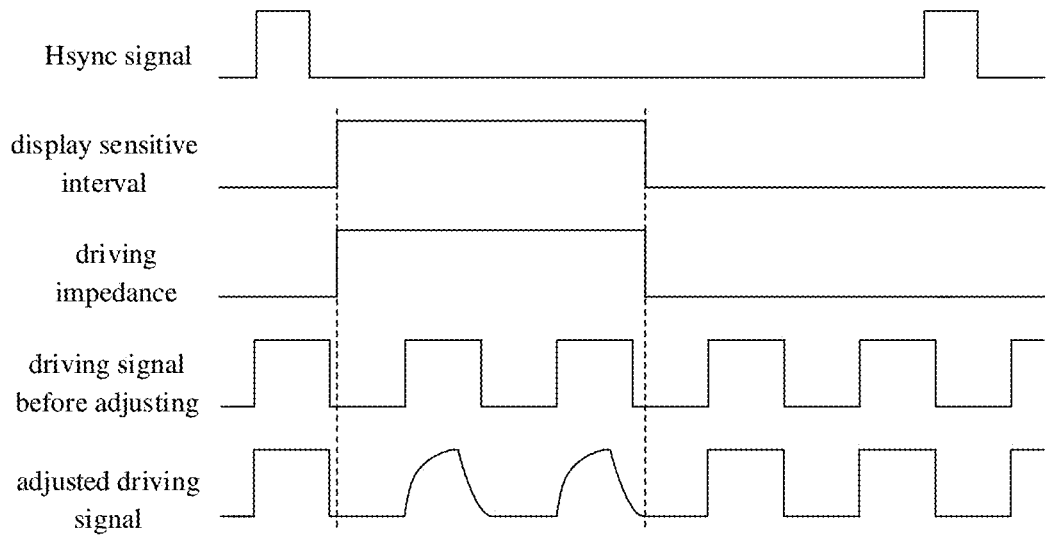
FIGS. 8-10 are schematic diagrams of a waveform of a driving signal output by the touch control chip shown in FIG. 7.

For example, as shown in FIG. 8, taking the scanning cycle of the horizontal synchronization signal including one display sensitive interval as an example, when the driving impedance of the driving circuit 710 is not adjusted, the driving signal is flipped vertically in the display sensitive interval, that is, the level of the driving signal suddenly increases or decreases, which can affect the pixel data of the display layer and cause a phenomenon of the water ripples. After adjusting the driving impedance of the driving circuit 710, it can be seen that both the slope of the rising edge and the slope of the falling edge become small, the rising and falling of the level of the driving signal become slow, and the rising and falling of the level of the driving signal require more time, which reduces crosstalk and coupling to the display layer, and reduces or eliminates the phenomenon of the water ripples to a certain extent.

This method can retain a signal amount of the driving signal to the maximum, and the magnitude of the driving impedance in the display sensitive interval can be determined according to an attenuation degree of the driving signal and a suppression effect on the water ripples. Generally, the more the driving impedance is increased, the better the effect of eliminating the water ripples, but the greater the attenuation of the driving signal. Therefore, a selection of the magnitude of the driving impedance in the display sensitive interval should reduce the phenomenon of the water ripples and avoid excessive loss of the amount of information carried by the driving signal.

For example, when the driving signal output by the touch control chip 700 is the uplink driving signal of the active pen, if the driving impedance in the display sensitive interval is too small, the suppression effect on the water ripples is not obvious; and if the driving impedance in the display sensitive interval is too great, a waveform of the uplink driving signal may change greatly, and an original signal amount may be easily lost, so that the active pen cannot decode the uplink driving signal correctly. Therefore, the selection of the magnitude of the driving impedance in the display sensitive interval should avoid to generate the water ripples on the basis of meeting a bit error rate of the active pen.

The driving impedance of the driving circuit 710 can be a constant value in the display sensitive interval, but considering different periods in the display sensitive interval, the influence of the driving signal on the display layer is different, so that the driving impedance can also be changed in the display sensitive interval. When the driving impedance can be changed in the display sensitive interval, the driving impedance can be adjusted to have different magnitudes in different periods of the display sensitive interval, and a value of the driving impedance in different periods of the display sensitive interval is greater than the value of the driving impedance in the time interval outside the display sensitive interval. For example, the display sensitive interval may include a plurality of periods, and a value of the driving impedance in the plurality of periods is at least partially unequal.

A value of the driving impedance in the plurality of periods is determined according to an influence degree of the display layer affected by the driving signal in the plurality of periods. For example, a value of the driving impedance in a period with a high influence degree is greater than a value of the driving impedance in a period with a small influence degree.

Figure 9:
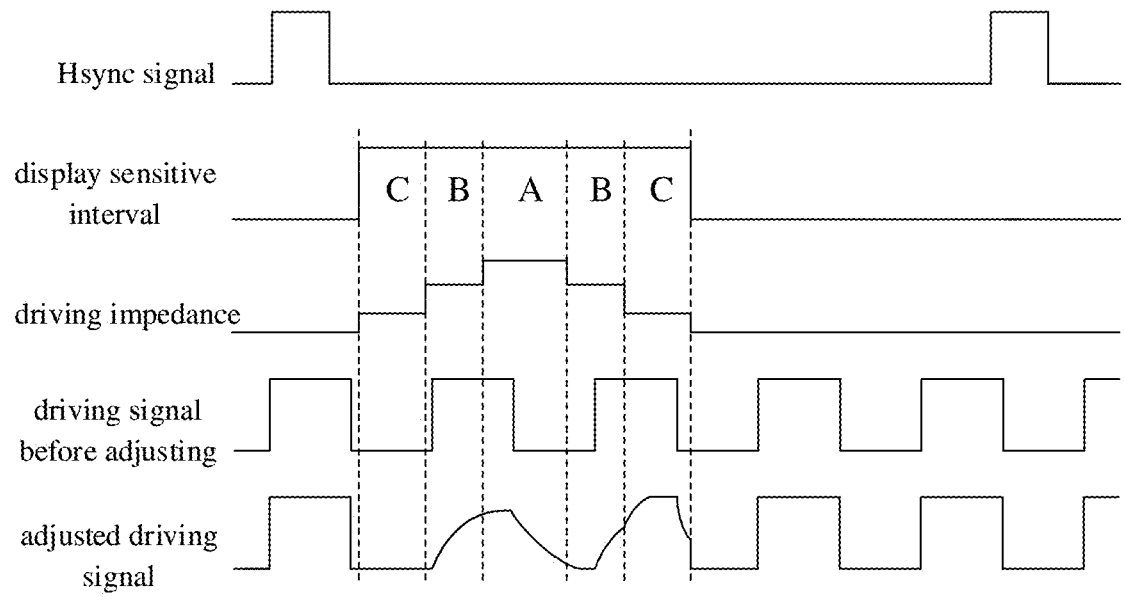

Taking FIG. 9 as an example, the display sensitive interval includes five periods, where the display layer in the A period is easily affected by the driving signal, followed by the B period, and the C period is hard to be affected by the driving signal. Therefore, the driving impedance in the A period can be adjusted to a large value, the driving impedance in the two B periods can be adjusted to a middle value, and the driving impedance in the two C periods can be adjusted to a small value. Similar to a principle of FIG. 8, a slope of the driving signal in the C period, the B period and the A period decreases successively, so that the water ripples can be reduced in a more targeted manner.

The influence degree of the display layer affected by the driving signal in each period in FIG. 9 can be obtained by testing. For example, by intentionally outputting the driving signal, and making the reversing time collide with the display sensitive interval at different times, at the same time, checking a degree of the water ripples on the display during a collision, it can be judged that which period in the display sensitive interval is more affected and which period is less affected.

For the method shown in FIG. 9, since the driving impedance requires more different values, implementation difficulty and cost may increase, and a control method can be more complicated. However, this method can control the driving signal more accurately and flexibly, and has a better suppression effect on the water ripples, In addition, since the driving impedance is adjusted in segments in the display sensitive interval, for a period when the display layer is less affected, the smaller the change of the waveform of the driving signal is, the more signal amount is retained while achieving a same effect of suppressing the water ripples.

In addition, when the magnitude of the driving impedance is adjusted in the segments in the display sensitive interval, accuracy of each magnitude of the driving impedance does not need to be too high, and a fault tolerance of the driving impedance is better. However, for the method shown in FIG. 8, the driving impedance has only one value in the display sensitive interval, and if it is set too large, a signal attenuation of the driving signal is too much, and if it is set too small, the suppression effect on the water ripples is not obvious, so it is necessary to select the magnitude of the driving impedance more reasonably and accurately.

Figure 10:
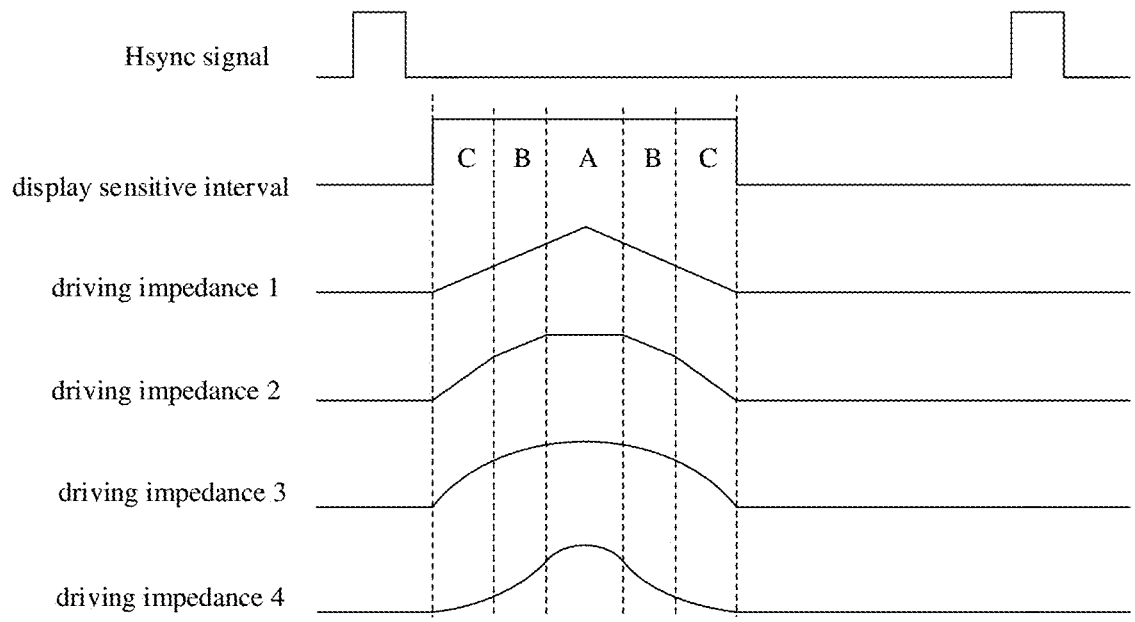

In addition to the adjustment method of the driving impedance shown in FIG. 8 and FIG. 9, the driving impedance can be set to a linear adjustment method in the display sensitive interval according to several methods shown in FIG. 10, such as a driving impedance 1 shown in FIG. 10; or can be set to a piecewise linear adjustment method, such as a driving impedance 2 shown in FIG. 10; or can be set to a non-linear adjustment method, such as a driving impedance 3 shown in FIG. 10; and or can be set to a piecewise non-linear adjustment method, such as a driving impedance 4 shown in FIG. 10.

The embodiments of the present application do not limit how to determine the display sensitive interval. The display sensitive interval can be determined by testing, for example, by intentionally outputting the driving signal, and making the revising time collide with the display sensitive interval at different times, at the same time, checking the degree of the water ripples on the display during the collision, the display sensitive interval can be determined; or for the pixel update interval included in the display sensitive interval, it can also be determined according to a scanning frequency of the horizontal synchronization signal of the display layer, and for a determined screen, a phase relationship between the horizontal synchronization signal of the display layer and the pixel update interval is fixed.

The touch control chip 700 can preset a driving impedance with a suitable magnitude for the pixel update interval. After the touch control chip 700 obtains the transmission of the horizontal synchronization signal of the display layer, it can be known where the display sensitive interval is, and during the period of outputting the driving signal to the touch control layer, the driving impedance is adjusted to a preset magnitude in the display sensitive interval.

It should be understood that the driving impedance of the driving circuit 710 includes the impedance generated by wiring, switching, etc. in the driving circuit 710, in addition, the impedance generated by a resistance element is also included. In the embodiments of the present application, the resistance element can be used to change the driving impedance of the driving circuit 710.

Figure 11:
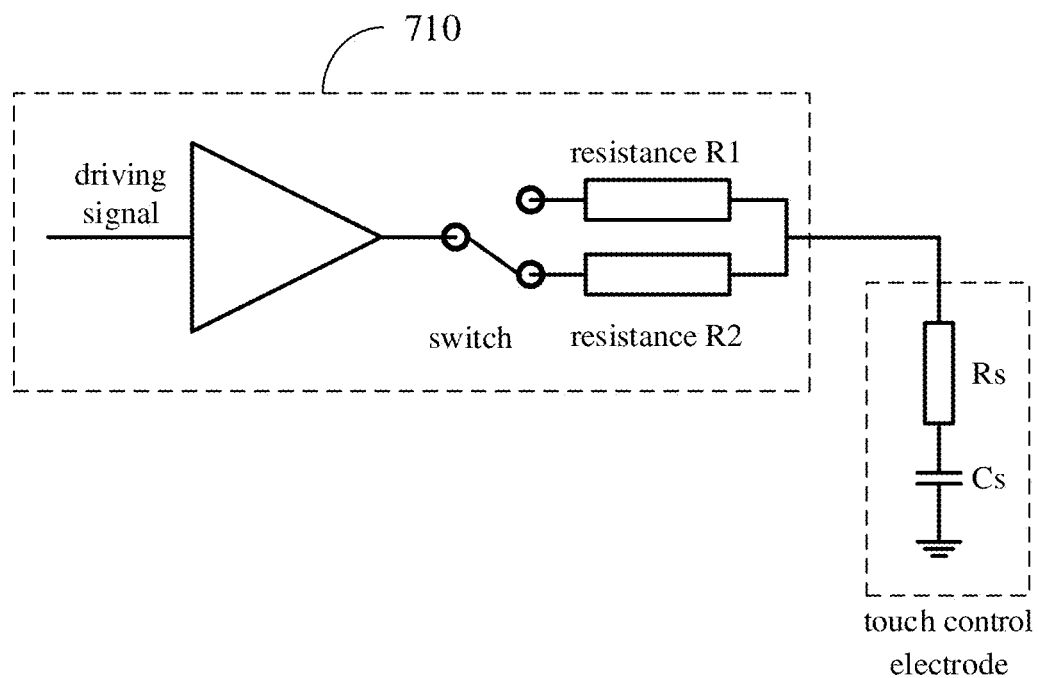
FIG. 11 is a schematic diagram of one possible implementation manner of a driving circuit 710.

In an implementation manner, for example, as shown in FIG. 11, the driving circuit 710 includes a first resistance and a second resistance, and the first resistance is greater than the second resistance, where the control circuit 720 is specifically used to: during the period when the driving circuit 710 outputs the driving signal, control the first resistance to be turned on in the display sensitive interval, and control the second resistance to be turned on in the time interval outside the display sensitive interval, so that a value of the driving impedance in the display sensitive interval is greater than a value of the driving impedance in the time interval outside the display sensitive interval.

In FIG. 11, the driving circuit includes a resistance R1 and a resistance R2, and it is assumed that the resistance R1 is greater than the resistance R2. Then, the control circuit 720 can control the switch to select the resistance R1 to be turned on and the resistance R2 to be turned off in the display sensitive interval, and to select the resistance R2 to be turned on and the resistance R1 to be turned off in the time interval outside the display sensitive interval, so as to implement the adjusted driving signal shown in FIG. 8.

When the display sensitive interval includes a plurality of periods, for example, as shown in FIG. 9, a plurality of resistances can be set and respectively controlled by a plurality of switches, so that a resistance with an appropriate resistance value is selected to be turned on in each period.

Figure 12:
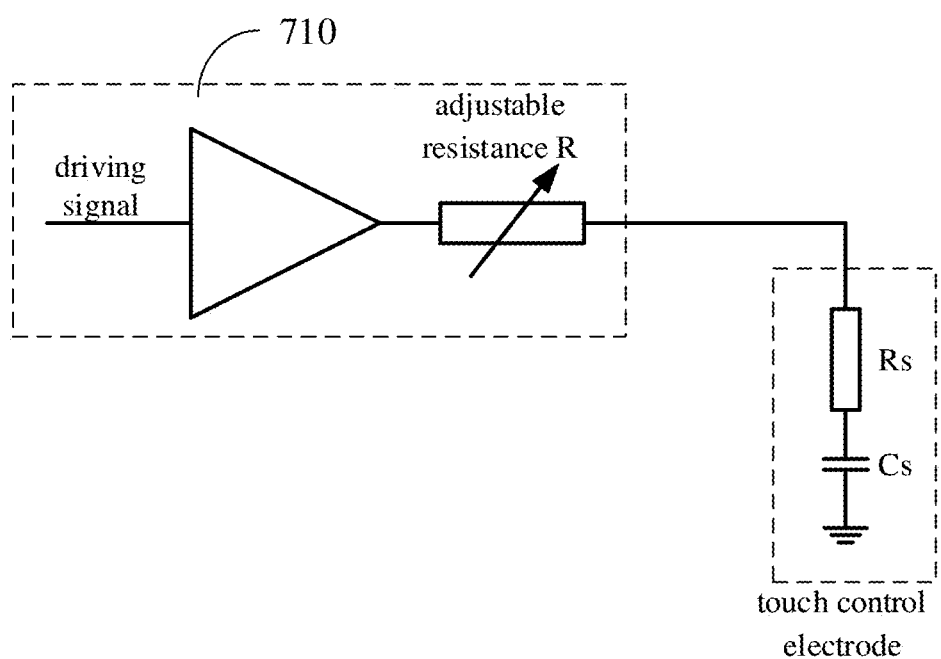
FIG. 12 is a schematic diagram of another possible implementation manner of a driving circuit 710.

In another implementation manner, for example, as shown in FIG. 12, the driving circuit 710 include an adjustable resistance, and the control circuit 720 is specifically configured to: during the period when the driving circuit 710 outputs the driving signal, adjust a resistance value of the adjustable resistance, so that a value of the driving impedance in the display sensitive interval is greater than a value of the driving impedance in the time interval outside the display sensitive interval.

The method shown in FIG. 12 is more general. In FIG. 12, the driving circuit includes an adjustable resistance R, the adjustable resistance R includes resistance values of a plurality of gears, and the control circuit 720 can adjust the resistance value of the adjustable resistance R as to change the driving impedance of the driving circuit 710. For example, the control circuit 720 adjusts the adjustable resistance to a large resistance value in the display sensitive interval, and the control circuit 720 adjusts the adjustable resistance to a small resistance value in the time interval outside the display sensitive interval, so as to implement the adjusted driving signal shown in FIG. 8. For another example, when the display sensitive interval is divided into the foregoing plurality of periods, the control circuit 720 adjusts the adjustable resistance to different resistance values in different periods, so as to match the influence degree of the driving signal on the display layer in different periods.

The touch control chip 700 may determine the display sensitive interval on the basis of, for example, the transmission of the horizontal synchronization signal of the display layer, so as to adjust according to the preset resistance value of the resistance in the display sensitive interval.

Table 1 shows the suppression effect on the water ripples when the method shown in FIG. 8 is adopted. Taking the uplink driving signal of the active pen adopting a universal stylus initiative (USI) protocol as an example, it is assumed that the uplink driving signal is input in the TX direction and the RX direction at the same time, where the low level of the uplink driving signal is 0V, and the high level is 10V. It can be set that the driving impedance of the driving circuit 710 in the display sensitive interval is about 900Ω, and the driving impedance of the driving circuit 710 in the time interval outside the display sensitive interval is about 10Ω. In the Table 1, it is defined that a quantitative value of the degree of the water ripples is 0 when the driving is not performed, and a quantitative value of the degree of the water ripples is 10 when the driving is performed normally but the solution of the present application is not adopted. The Table 1 shows the change of the degree of the water ripples of two screens, that is, screen A and screen B, with a length of the display sensitive interval when the solution of the present application is adopted.

TABLE 1

| display sensitive interval/us | | 0.2 us | 0.5 us | 1 us | 2 us |
|---|---|---|---|---|---|
| degree of water ripples | not adopt the solution of the present application | not coding | 0 | 0 | 0 | 0 |
| | | coding | 10 | 10 | 10 | 10 |
| | adopt the solution of the present application | screen A | 8 | 2 | 2 | 1 |
| | | screen B | 6 | 2 | 1 | 0.2 |

It can be seen that the solution of the present application can effectively solve the problem of the water ripples by dynamically adjusting the magnitude of the driving impedance in the display sensitive interval and non-display sensitive interval. And, it can be seen from the Table 1 that the longer the display sensitivity interval, the smaller the quantitative value of the degree of the water ripples, and the better the suppression effect on the water ripples.

It should be noted that the touch control chip 700 of the embodiments of the present application may be applicable to touch control driving related applications, including but not limited to the self-capacitance detection, mutual-capacitance detection of the touch control layer and the touch driving with the active pen. In addition, in the embodiments of the present application, during a process when the display driving chip outputs the horizontal synchronization signal, the touch control chip 700 outputs the driving signal, and adjusts the driving impedance of the driving circuit 710 according to the display sensitive interval during the period of outputting the driving signal. However, this does not require synchronization between the driving signal itself output by the touch control chip 700 and the horizontal synchronization signal output by the display driving chip.

The present application further provides a driving method, a method 1300 can be performed by the foregoing touch control chip 700. As shown in FIG. 13, the method 1300 includes part of or all the following steps.

In a step 1310, a display sensitive interval of a display layer of a screen is acquired, where the display sensitive interval comprises a pixel update interval of the display layer, and the pixel update interval is a time interval for a pixel in the display layer to receive a data signal.

In a step 1320, a driving signal is output to a display layer of the screen, and during a period of outputting the driving signal, a driving impedance of a driving circuit in a touch control chip is adjusted, so that a value of the driving impedance in the display sensitive interval is greater than a value of the driving impedance in a time interval outside the display sensitive interval.

Therefore, by adjusting the driving impedance in the driving circuit of the touch control chip, the value of the driving impedance in the display sensitive interval of the display layer is greater than the value of the driving impedance in the time interval outside the display sensitive interval, so as to reduce influence of the driving signal output by the touch control chip on the display layer in the sensitive interval, ensuring a normal update of the pixel data of the display layer.

Optionally, in an implementation manner, the driving circuit includes a first resistance and a second resistance, the first resistance is greater than the second resistance, and adjusting the driving impedance of the driving circuit in the touch control chip, including: during the period of outputting the driving signal, controlling the first resistance to be turned on in the display sensitive interval, and controlling the second resistance to be turned on in the time interval outside the display sensitive interval, so that a value of the driving impedance in the display sensitive interval is greater than a value of the driving impedance in the time interval outside the display sensitive interval.

Optionally, in an implementation manner, the driving circuit includes an adjustable resistance, and adjusting the driving impedance of the driving circuit in the touch control chip, including: during the period of outputting the driving signal, adjusting a resistance value of the adjustable resistance, so that a value of the driving impedance in the display sensitive interval is greater than a value of the driving impedance in the time interval outside the display sensitive interval.

Optionally, in an implementation manner, a slope of a flipping edge of the driving signal in the display sensitive interval is smaller than a slope of the flipping edge of the driving signal in the time interval outside the display sensitive interval.

Optionally, in an implementation manner, the driving impedance is a constant value in the display sensitive interval.

Optionally, in an implementation manner, the driving impedance is variable in the display sensitive interval.

Optionally, in an implementation manner, the display sensitive interval includes a plurality of periods, and a value of the driving impedance in the plurality of periods is at least partially unequal.

Optionally, in an implementation manner, a value of the driving impedance in the plurality of periods is determined according to an influence degree of the display layer affected by the driving signal in the plurality of periods.

Optionally, in an implementation manner, a value of the driving impedance in a period with a high influence degree is greater than a value of the driving impedance in a period with a small influence degree.

It should be appreciated that the specific description of the method 1300 may refer to the relevant description of the touch control chip 700 in the foregoing FIGS. 7 to 12, and for brevity, it will not be repeated redundantly herein.

An embodiment of the present application further provides an electronic device, and the electronic device includes: a screen; and the touch control chip in the foregoing various embodiments of the present application.

By way of example and not limitation, the electronic device in the embodiments of the present application can be portable or mobile computing devices such as a terminal device, a mobile phone, a tablet computer, a notebook computer, a desktop computer, a gaming device, an in-vehicle electronic device or a wearable smart device, and other electronic devices such as an electronic database, an automobile and an automated teller machine (ATM). The wearable smart device includes a device such as a smart watch or smart glasses, that is of a full-featured and a large-sized and that can implement all or some functions without relying on a smart phone, and a device such as a smart bracelet or a smart jewelry for physical sign monitoring, that only focuses on a certain type of application function and shall be used in cooperation with other device such as a smart phone.

It should be noted that, in a case of no conflict, the various embodiments and/or the technical features in the various embodiments described in the present application may be combined with each other arbitrarily, and the technical solutions obtained after the combination should also fall within the protection scope of the present application.

It should be appreciated that specific examples in the embodiments of the present application are just for helping those skilled in the art better understand the embodiments of the present application, rather than for limiting the scope of the embodiments of the present application. Those skilled in the art can make various improvements and variations on the basis of the foregoing embodiments, and such improvements or variations are all within the protection scope of the present application.

The foregoing descriptions are merely specific implementation manners of the present application. However, the protection scope of the present application is not limited thereto, and those skilled in the art who are familiar with the art could readily think of variations or substitutions within the technical scope disclosed by the present application, and these variations or substitutions shall fall within the protection scope of the present application. Therefore, the protection scope of the present disclosure shall be subject to the protection scope of the claims.

What is claimed is:

1. A touch control chip, comprising:
   a driving circuit configured to output a driving signal to a touch control layer of a screen, wherein there is an overlap between a period when the driving circuit outputs the driving signal and a display sensitive interval of a display layer of the screen, wherein the display sensitive interval comprises a pixel update interval of the display layer, and the pixel update interval is the time interval for a pixel in the display layer to receive a data signal; and
   a control circuit configured to, during the period when the driving circuit outputs the driving signal, adjust a value of a driving impedance of the driving circuit in the display sensitive interval of the display layer to be greater than a value of the driving impedance in a time interval outside the display sensitive interval, so that a slope of a flipping edge of the driving signal in the display sensitive interval is smaller than a slope of the flipping edge of the driving signal in the time interval outside the display sensitive interval, wherein a peak amplitude of the driving signal in the display sensitive interval and in the time interval outside the display sensitive interval are equal.

2. The touch control chip according to claim 1, wherein the driving circuit comprises a first resistance and a second resistance, the first resistance is greater than the second resistance, and the control circuit is specifically configured to:
   during the period when the driving circuit outputs the driving signal, control the first resistance to be turned on in the display sensitive interval, and control the second resistance to be turned on in the time interval outside the display sensitive interval, so that a value of the driving impedance in the display sensitive interval is greater than a value of the driving impedance in the time interval outside the display sensitive interval.

3. The touch control chip according to claim 1, wherein the driving circuit comprises an adjustable resistance, and the control circuit is specifically configured to:
   during the period when the driving circuit outputs the driving signal, adjust a resistance value of the adjustable resistance, so that a value of the driving impedance in the display sensitive interval is greater than a value of the driving impedance in the time interval outside the display sensitive interval.

4. The touch control chip according to claim 1, wherein the driving impedance is a constant value in the display sensitive interval.

5. The touch control chip according to claim 1, wherein the driving impedance is variable in the display sensitive interval.

6. The touch control chip according to claim 5, wherein the display sensitive interval comprises a plurality of periods, and a value of the driving impedance in the plurality of periods is at least partially unequal.

7. The touch control chip according to claim 6, wherein a value of the driving impedance in the plurality of periods is determined according to an influence degree of the display layer affected by the driving signal in the plurality of periods.

8. The touch control chip according to claim 7, wherein a value of the driving impedance in a period with a high influence degree is greater than a value of the driving impedance in a period with a small influence degree.

9. The touch control chip according to claim 1, wherein the driving signal is at least one of the following:
   a driving signal configured for a self-capacitance detection of the touch control layer;
   a driving signal configured for a mutual-capacitance detection of the touch control layer; and
   a driving signal transmitted by the touch control layer to an active pen.

10. An electronic device, comprising:
    a screen; and
    the touch control chip according to claim 1.

11. A driving method, comprising:
    acquiring a display sensitive interval of a display layer of a screen, wherein the display sensitive interval comprises a pixel update interval of the display layer, and the pixel update interval is a time interval for a pixel in the display layer to receive a data signal;
    outputting a driving signal to a display layer of the screen, wherein there is an overlap between a period when a driving circuit outputs the driving signal and the display sensitive interval, and during the period of outputting the driving signal, adjusting a value of a driving impedance of a driving circuit in a touch control chip to be greater that than a value of the driving impedance in a time interval outside the display sensitive interval, so that a slope of a flipping edge of the driving signal in the display sensitive interval is smaller than a slope of the flipping edge of the driving signal in the time interval outside the display sensitive interval, wherein a peak amplitude of the driving signal in the display sensitive interval and in the time interval outside the display sensitive interval are equal.

12. The method according to claim 11, wherein the driving circuit comprises a first resistance and a second resistance, the first resistance is greater than the second resistance, and adjusting the driving impedance of the driving circuit in the touch control chip, comprising:
    controlling the first resistance to be turned on in the display sensitive interval, and controlling the second resistance to be turned on in the time interval outside the display sensitive interval, so that a value of the driving impedance in the display sensitive interval is greater than a value of the driving impedance in the time interval outside the display sensitive interval.

13. The method according to claim 11, wherein the driving circuit comprises an adjustable resistance, and adjusting the driving impedance of the driving circuit in the touch control chip, comprising:
    adjusting a resistance value of the adjustable resistance, so that a value of the driving impedance in the display sensitive interval is greater than a value of the driving impedance in the time interval outside the display sensitive interval.

14. The method according to claim 11, wherein the driving impedance is a constant value in the display sensitive interval.

15. The method according to claim 11, wherein the driving impedance is variable in the display sensitive interval.

16. The method according to claim 15, wherein the display sensitive interval comprises a plurality of periods, and a value of the driving impedance in the plurality of periods is at least partially unequal.

17. The method according to claim 16, wherein a value of the driving impedance in the plurality of periods is determined according to an influence degree of the display layer affected by the driving signal in the plurality of periods.

18. The method according to claim 17, wherein a value of the driving impedance in a period with a high influence degree is greater than a value of the driving impedance in a period with a small influence degree.

* * * * *